Dec. 24, 1929.  H. C. A. MEYER  1,741,064
VALVE OPERATING MECHANISM
Filed April 24, 1925   3 Sheets-Sheet 3
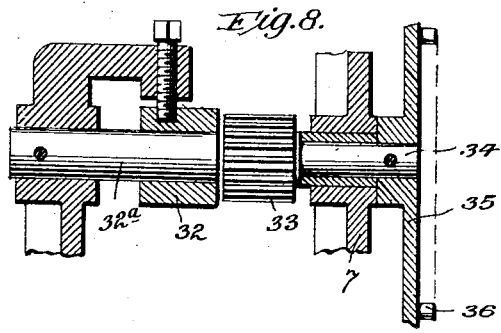
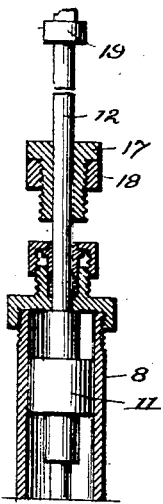
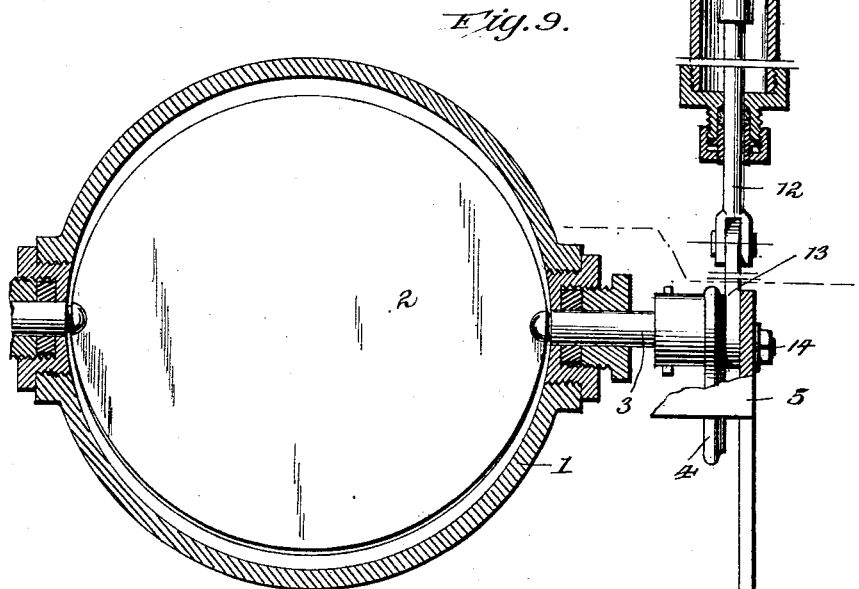
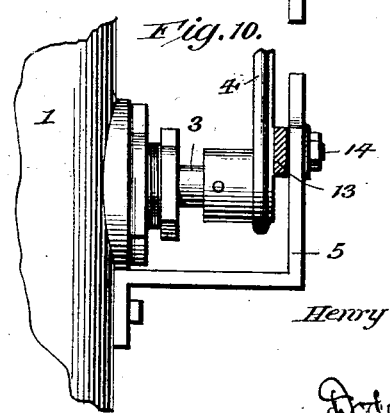
Inventor:
Henry C. A. Meyer,
Attorneys.

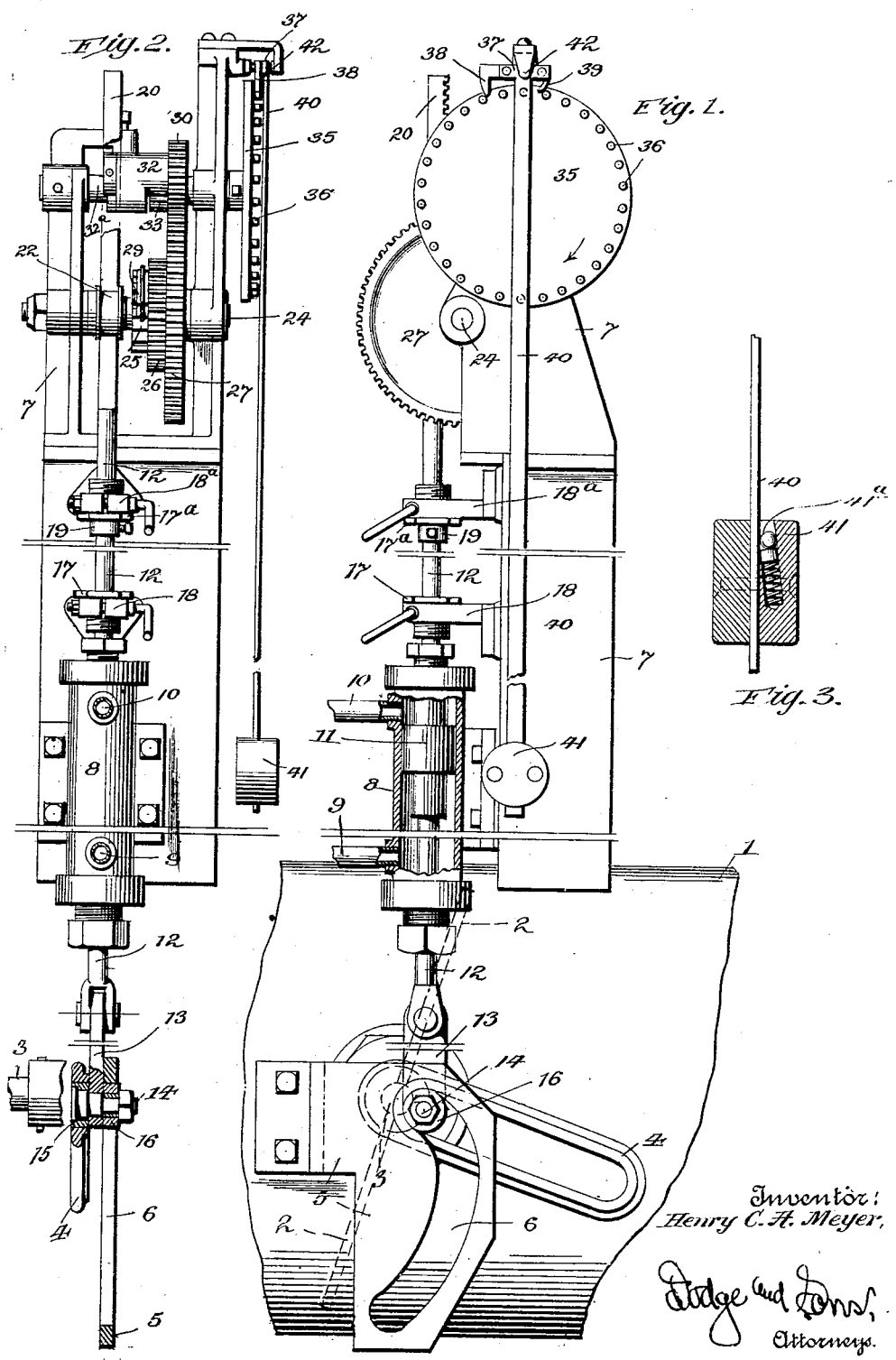

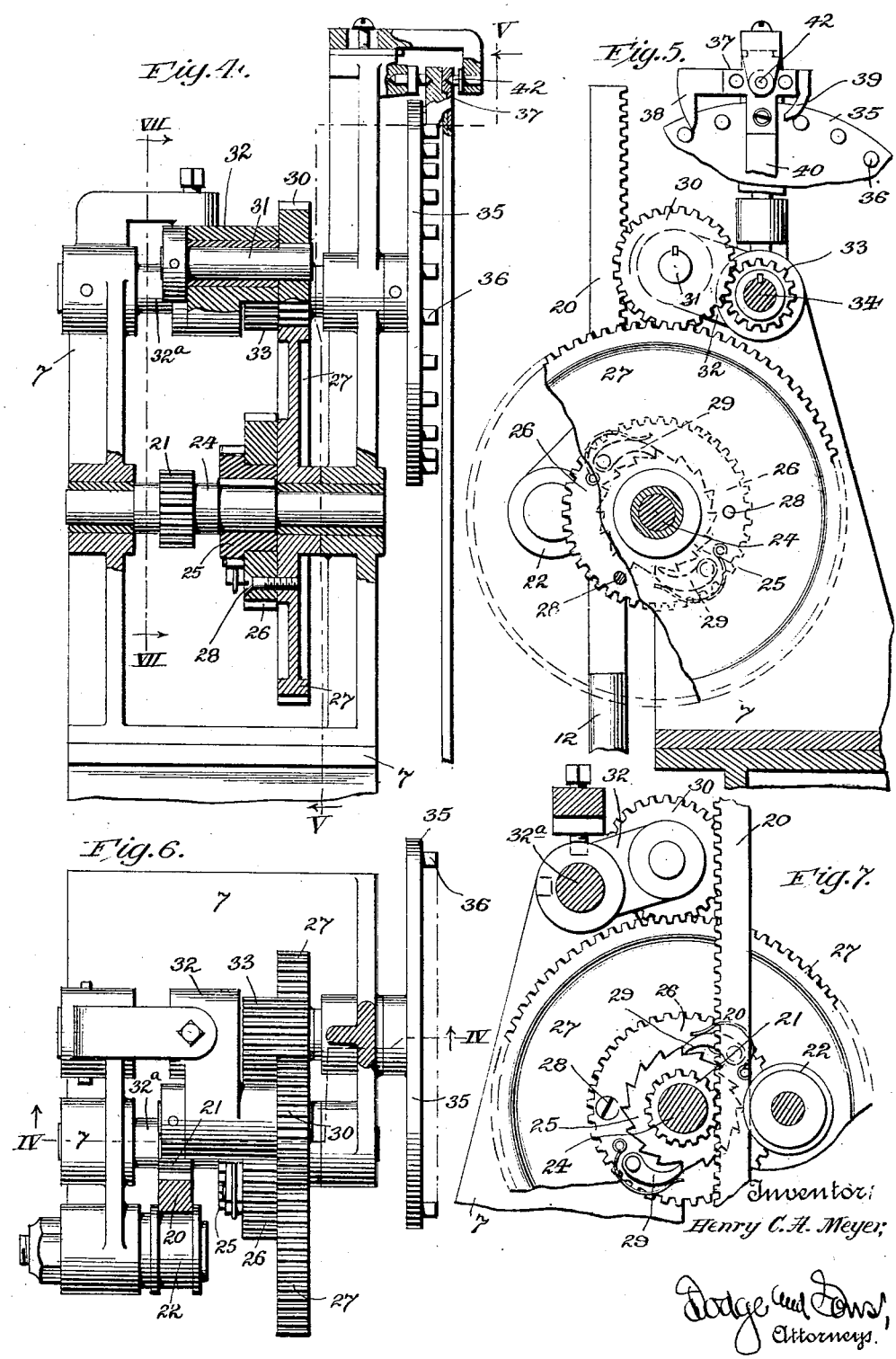

Patented Dec. 24, 1929

1,741,064

UNITED STATES PATENT OFFICE

HENRY C. A. MEYER, OF BALTIMORE, MARYLAND, ASSIGNOR TO THE BARTLETT HAYWARD COMPANY, OF BALTIMORE, MARYLAND, A CORPORATION OF MARYLAND

VALVE-OPERATING MECHANISM

Application filed April 24, 1925. Serial No. 25,719.

This invention pertains to valve operating mechanisms and has to do more particularly with means for opening and closing of air control valves employed in gas producer sets. The mechanism hereinafter set forth in detail provides means for controlling or regulating the initial area of flow, the rate of increase of such area and the final area and consequently the amount of flow of air through a pipe or conduit. The mechanism has been found highly efficient in regulating the flow of secondary air in a gas set.

Briefly stated, the mechanism may be said to comprise a damper or valve; a motor for opening the same, said motor deriving its power from hydraulic lines connected to, say, the mains which control the carbureter blast valve; means providing a constant speed control for the motor, which may be varied as required; and means, such as a variable ratio connection between the motor and damper for controlling the opening of the damper to produce a predetermined increasing area of opening.

A preferred embodiment of the invention is illustrated in the annexed drawings wherein:

Fig. 1 is a side elevation of the mechanism;

Fig. 2 a similar view as seen from the left-hand side of Fig. 1;

Fig. 3 a detail view of the adjustable pendulum weight;

Fig. 4 an enlarged detail vertical sectional view of the gear train interposed between the rack connected to the motor and the pendulum, the line of section being indicated by IV—IV of Fig. 6;

Fig. 5 a vertical sectional view taken on the line V—V of Fig. 4;

Fig. 6 a top plan view partly in section;

Fig. 7 a vertical sectional view on the line VII—VII of Fig. 4;

Fig. 8 a detail sectional view of a portion of the gear supporting frame, the pin disk and its allied pinion;

Fig. 9 a sectional elevation of the air pipe, the motor and its allied parts, and Fig. 10 a detail view of a portion of the damper actuating arm and its guiding cam.

Referring to the annexed drawings, 1 indicates the air pipe or main to which air under pressure is supplied. Located within the pipe is a butterfly damper or valve 2, one of the stub axles of pintles 3 whereof has affixed to it a slotted arm or lever 4. Secured to the pipe or any other suitable fixed support is a bracket 5 having formed therein a cam slot 6 which affects the extent and speed of opening of the valve as will presently appear.

Located above the pipe is a fixed stand or frame 7 which forms the support for the motor and its restraining or speed control mechanism. Rigidly secured to said frame is a cylinder 8, having two connections 9 and 10 leading to the hydraulic lines supplying say, the control valve of the main carbureter blast valve so that the piston 11 travels downward as and when said blast valve opens. The piston rod 12, secured to the piston, extends through both ends of the cylinder and at its lower end has pivoted thereto a link 13 in the lower end whereof is mounted a bolt or pin 14, Fig. 2, having two rollers 15 and 16 mounted thereon which extend respectively into the slotted arm or lever 4 and the cam slot 6.

The upper end of the piston rod passes freely through bushings 17 and 17$^a$ threaded for vertical adjustment in fixed brackets 18 and 18$^a$. Said bushings co-operate with a stop collar 19 secured to the piston rod 12 to limit the extent of movement of the rod and piston and, as a consequence, to limit the extent to which the valve or damper may be opened or closed; it being an object of the invention that the valve shall stop short of its fully closed position as indicated in Fig. 1.

Piston rod 12 at its upper end carries a rack 20 which meshes with a pinion 21, Figs. 6 and 7, and is held in proper working relation thereto by a guide roller 22. Pinion 21 is formed upon or secured to a shaft 24 which is mounted for rotation in suitable bearings formed in the upper portion of frame 7. Keyed to said shaft so as to rotate therewith is a ratchet wheel 25, said wheel having an elongated hub upon which latter is mounted a gear 26, said gear being secured to a larger gear 27 by screws 28. Gear 27 finds its bearing on the elongated sleeve or bushing, (see Fig. 4) of the adjacent bearing for shaft 24.

A pair of oppositely disposed spring pressed pawls 29 are pivotally mounted on the face of gear 26 and are constantly in engagement with the ratchet 25. It follows, therefore, (see Fig. 7) that as the rack 20 is moved downwardly through the action of the motor, motion is imparted to pinion 21 and as a consequence to gears 26 and 27; on the other hand, however, when the rack is forced upwardly imparting a reverse movement to pinion 21, the gears 26 and 27 will remain at rest owing to the fact that the teeth of the ratchet wheel slide under the pawls.

Gear 27 in the position of the parts shown meshes with a smaller gear 30 mounted upon a shaft 31 supported in an arm 32, which latter is adjustably supported on a fixed post or shaft 32ª (see Fig. 8), said smaller gear 30 in turn engaging a pinion 33 secured upon a shaft 34 mounted in a fixed bearing in the frame 7. If it be desired to change the gear ratio, the arm 32 may be released and moved to the left (Figs. 6 and 8), then swung downwardly so as to bring gear 30 into mesh with gear 26, said gear 30 still retaining its meshing engagement with the pinion 33 by reason of the fact that said pinion is elongated. To the outer end of said shaft 34 is secured a pin wheel 35, the pins 36 whereof are adapted to co-operate with a propelling escapement, comprising a pivoted cross bar 37 provided with two downwardly extending camming fingers 38 and 39, said fingers being of such length that when the parts are at rest, (see Fig. 5) they both engage separate pins, as shown in Figs. 1 and 5. Rigidly secured to the cross bar 37 is a pendulum bar 40 upon the lower end of which is adjustably secured a weight 41, such weight being held in its adjusted position by a spring pressed lock, as a ball 41ª, Fig. 3.

The camming faces of the fingers are struck upon curves with the pivotal point 42 of the pendulum as a center, and the degree of angularity is such as to cause the pendulum to begin to oscillate from a state of rest.

In operation when the main carbureter blast opens, water is automatically admitted to connection 10 of hydraulic cylinder 8 thereby causing the piston to descend. Such downward movement causes the rack to set the gear train in motion and to impart a clockwise movement to the pin wheel or disk 35. This sets the pendulum in motion and it acts to restrain the downward movement of the piston, or, in other words, acts as a constant speed control for the motor and ensures a uniform downward motion of the piston. By raising or lowering the weight, the time interval for the control of the piston during a complete stroke or a part thereof may be shortened or lengthened as desired. As the piston moves downwardly to its lowermost position, rollers 15 and 16 travel respectively in cam slot 6 and in the slotted lever 4 which has the effect of moving the lever 4 with such varying angular movement as is permitted by the shape of the cam slot 6. The cam shown has been designed for providing a uniformly increasing supply of air flowing through a circular pipe and governed by a circular damper. Variations may be made in the shape of the cam to compensate for numerous special local conditions, for better operation.

When pressure is relieved above the piston, it will be moved upwardly by pressure fluid entering pipe 9 below the piston, such upward movement being quick owing to the presence of the ratchet wheel 25, which allows the rack and piston to move without imparting motion to the gear train and the pendulum. Thus the valve may be quickly closed.

Stop collar 19 is provided for limiting the stroke of the piston and its allied valve actuating parts, said collar contacting the adjustable limit stops 18 and 18ª. The object of this is to prevent the butterfly from completely closing so that the next sequence or blow begins with an initial amount of air, the amount of which has been regulated to meet the service requirements or conditions.

It is of course manifest that the movement of the parts may be reversed, it being necessary only that the valve lever and the co-operating cam be changed in position to cause them to properly function.

It will also be evident that instead of employing a link connection between the piston rod and valve lever other connections may be employed to suit particular local conditions.

What is claimed is:

1. In combination with a conduit; a valve mounted therein and having a progressive flow varying characteristic throughout its range of motion; a motor; a connection between the motor and the valve including a cam acting to regulate and determine the angular movement of the valve about its axis; and means acting upon the motor during the opening of the valve to render its speed substantially constant.

2. In combination with a conduit; a valve mounted therein and having a progressive flow varying characteristic throughout its range of motion; a motor; a connection between the motor and the valve including a cam acting to regulate and determine the angular opening movement of the valve about its axis; and means, including a pendulum, set in motion and driven by the motor, for regulating the speed of the latter upon the opening movement of the valve.

3. In combination with a conduit; a valve mounted therein and having a progressive flow varying characteristic throughout its range of motion; a motor; a connection between the motor and the valve including a cam acting to regulate and determine the angular opening movement of the valve about its axis; a rack actuated by the motor; a gear train, including a ratchet mechanism actuated by the rack during the opening movement of the valve, said ratchet mechanism allowing the rack to run free as the valve closes; a pin wheel actuated by the gear train; and a pendulum co-operating with the pin wheel and actuated thereby.

In testimony whereof I have signed my name to this specification.

HENRY C. A. MEYER.